United States Patent [19]
Noguchi et al.

[11] Patent Number: 5,448,355
[45] Date of Patent: Sep. 5, 1995

[54] SYSTEM FOR MEASURING TILT OF IMAGE PLANE OF OPTICAL SYSTEM USING DIFFRACTED LIGHT

[75] Inventors: Masato Noguchi; Takashi Iizuka, both of Tokyo, Japan

[73] Assignee: Asahi Kogaku Kogyo Kabushiki Kaisha, Tokyo, Japan

[21] Appl. No.: 220,682

[22] Filed: Mar. 31, 1994

[30] Foreign Application Priority Data

Mar. 31, 1993 [JP] Japan .................. 5-073558
Apr. 12, 1993 [JP] Japan .................. 5-084408

[51] Int. Cl.⁶ .......................................... G01B 9/02
[52] U.S. Cl. .................... 356/354; 356/356; 356/363; 250/237 G
[58] Field of Search ............... 356/353, 354, 355, 356, 356/363; 250/237 G

[56] References Cited

U.S. PATENT DOCUMENTS

| | | |
|---|---|---|
| 3,751,170 | 8/1973 | Hidaka . |
| 3,833,807 | 9/1974 | Takeda . |
| 3,879,136 | 4/1975 | Takeda . |
| 5,011,287 | 4/1991 | Mino .................. 356/354 |
| 5,074,666 | 12/1991 | Barnes et al. ............ 356/354 |

*Primary Examiner*—Samuel A. Turner
*Assistant Examiner*—Robert Kim
*Attorney, Agent, or Firm*—Sandler, Greenblum & Bernstein

[57] ABSTRACT

A system used for measuring the tilt of an image formed by a lens. The measuring system has a light source, a diffraction grating, a reflection surface and a detector for detecting an interference pattern that is formed by the light after passing through the diffraction grating reflection surface and the lens.

27 Claims, 11 Drawing Sheets

SYSTEM FOR MEASURING TILT OF IMAGE PLANE OF OPTICAL SYSTEM USING DIFFRACTED LIGHT

BACKGROUND OF THE INVENTION

The present invention relates to a system for measuring a tilt of an image plane, which is formed by a lens, with respect to a predetermined plane.

A lens system used in an optical instrument such as a camera, binoculars, etc., has a casing which houses many lenses. In order to produce a well focused image, the lenses must be aligned accurately within the casing. If even one of the lenses is misaligned, the resulting image plane may be tilted. If the image plane is tilted, the central area of the image would be focused, but the peripheral area of the image would be out-of-focus. Thus, the lens must be carefully assembled.

Even if the assembly is carefully monitored, a misalignment of a lens could result in the image plane being inclined with respect to the desired image plane.

On the other hand, even if a carefully assembled lens is employed in a camera, the film plane of the camera could be inclined with respect to an image plane formed by the lens.

SUMMARY OF THE INVENTION

It is therefore an object of the present invention to provide an efficient way of determining whether a lens system forms an image plane that is out of alignment with respect to a reference plane.

Another object of the present invention is to provide an efficient way of determining whether a film plane of a camera is out of alignment with respect to an image plane.

According to one aspect of the present invention, there is provided a system measuring a tilt of an image plane focused by a lens relative to a predetermined plane. including:

a light source for emitting light towards the lens;

a diffraction grating located between said light source and the lens, wherein said lens converges light passed through the diffraction grating;

a reflection surface formed on the predetermined plane to reflect predetermined components of light passed through the lens toward the lens, wherein the predetermined plane is located at the focal point of the lens; and means for detecting an interference pattern formed by light which is reflected by the reflection surface, passed through the lens, and passed through the diffraction grating.

According to another aspect of the invention, there is provided an image tilt measuring system, including:

a light source for emitting coherent light towards an optical system to be examined;

a diffraction grating provided between the light source and the optical system; means for rotating the diffraction grating about an axis which is parallel to the optical axis of the system;

a reference reflection plane located at a focal point of the optical system to reflect light which is diffracted by said diffraction grating and passed through the optical system;

detecting means for a detector an interference pattern, which is formed by different order components of diffracted light which have passed through the diffraction grating and the optical system, with rotation of the diffraction grating.

According to further aspect of the invention, there is provided a system for measuring tilt of an image, including a light source for emitting coherent light towards an optical system to be examined;

a diffraction grating provided between the light source and the optical system;

a reference reflection plane located at a focal point of the optical system to reflect light which is diffracted by said diffraction grating and passed through the optical system;

a mechanism for receiving an interference pattern image which is formed by different order components of diffracted light which have passed through the diffraction grating and the optical system, and for converting the image into an image data;

a device for measuring a condition of the image plane with respect to the reference reflection plane based on said image data; and a moving mechanism for moving the diffraction grating in order to shift the phase of the different order components of the diffracted light.

DESCRIPTION OF THE EMBODIMENTS

Figure 1:
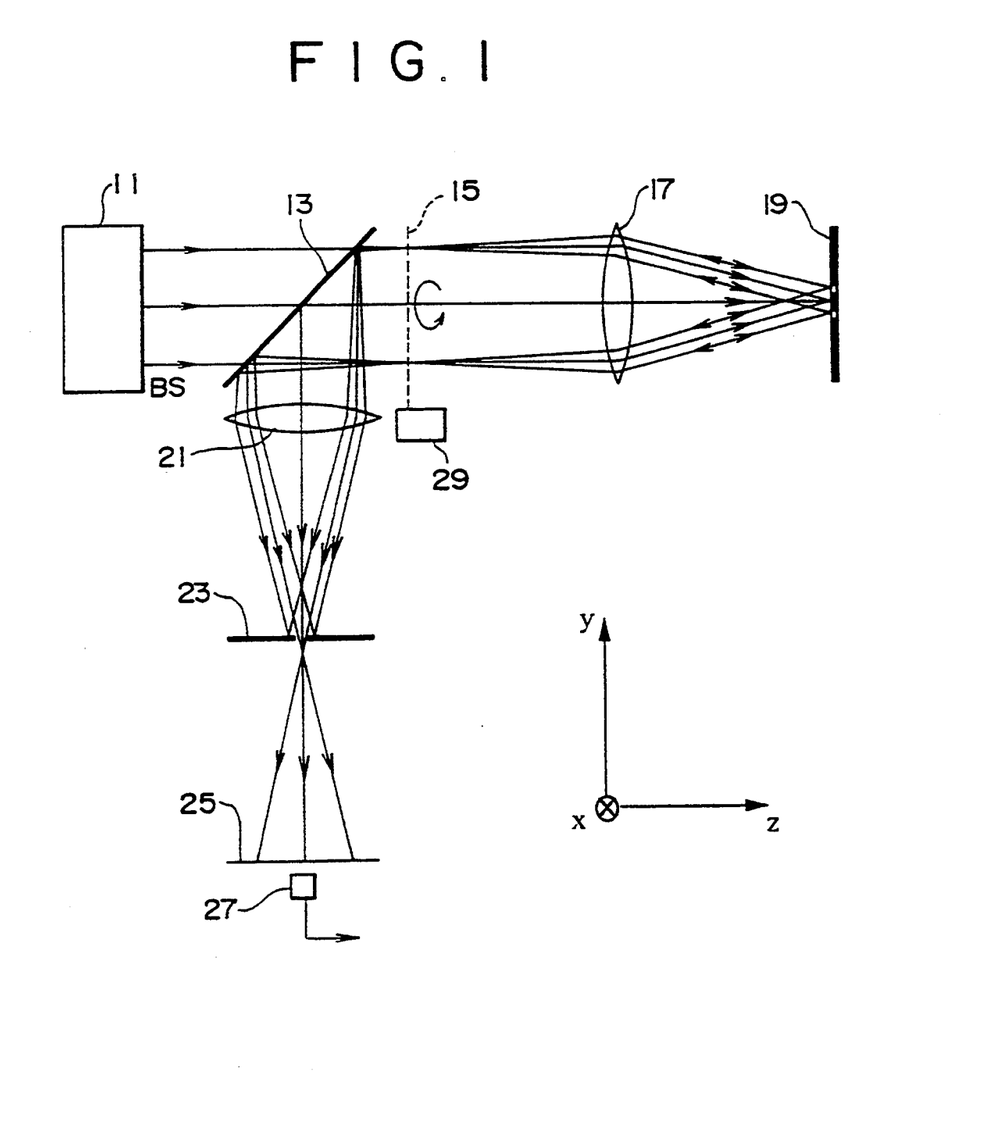
FIG. 1 shows the construction of a system used to measure tilt of an image plane of a lens system with respect to a reference plane.

FIG. 1 shows an optical schematic construction of the image tilt measuring system used for testing a lens. A parallel ray of light emitted by a laser source 11 passes through a half-mirror 13, and a diffraction grating 15. The diffracted light is transmitted through a lens 17 (the lens under test), and focused on a reference plane 19. The reference plane 19 is formed such that it reflects only the +1st and −1st order diffracted components of light. The other diffracted components are absorbed or passed through the reference plane 19. For this purpose, the reference plane 19 is provided with a reflection surface which is formed as a ring. The center of the reflection surface and areas outside the reflection surface are non-reflective. The reference plane 19 is positioned substantially at the focal point of the lens 17, and is positioned perpendicular to the optical axis of the measuring system. In this embodiment, the lens 17 is adjusted to focus on an object at infinity.

The reflected +1st order and −1st order diffracted components are reflected by the reference plane 19 and return along the paths, and pass through the lens 17 and the diffraction grating 15. The light is then reflected by the half mirror 13, and converged by a convergence lens 21. A spatial filter 23 is provided at the focal point of the convergence lens 21. The spatial filter 23 has an opening at the central area thereof. The −1st order diffracted component of the reflected +1st order diffracted light, and the +1st order diffracted component of the reflected −1st order diffracted light, pass through the opening of the spatial filter 23, and interfere with each other to form an interference pattern image on a observation plane 25. The interference pattern image at an area 28 (see FIG. 3) is detected by a photodetector 27 and converted into an electrical signal.

The diffraction grating 15 has a plurality of parallel slits spaced a predetermined distance apart. Each slit extends in the direction of an x-axis in FIG. 1. The diffraction grating 15 is positioned at or closely adjacent to the front focal point of the lens 17, and perpendicular to the optical axis of the measuring system. The diffraction grating 15 is rotatably supported by a rotation mechanism 29 so that it can be rotated about the optical axis of the measuring system.

The electrical signal outputted by the photodetector 27 is processed by a computer, and printed or displayed on a displaying device in order to analyze the tilt of the image.

Figure 2A:
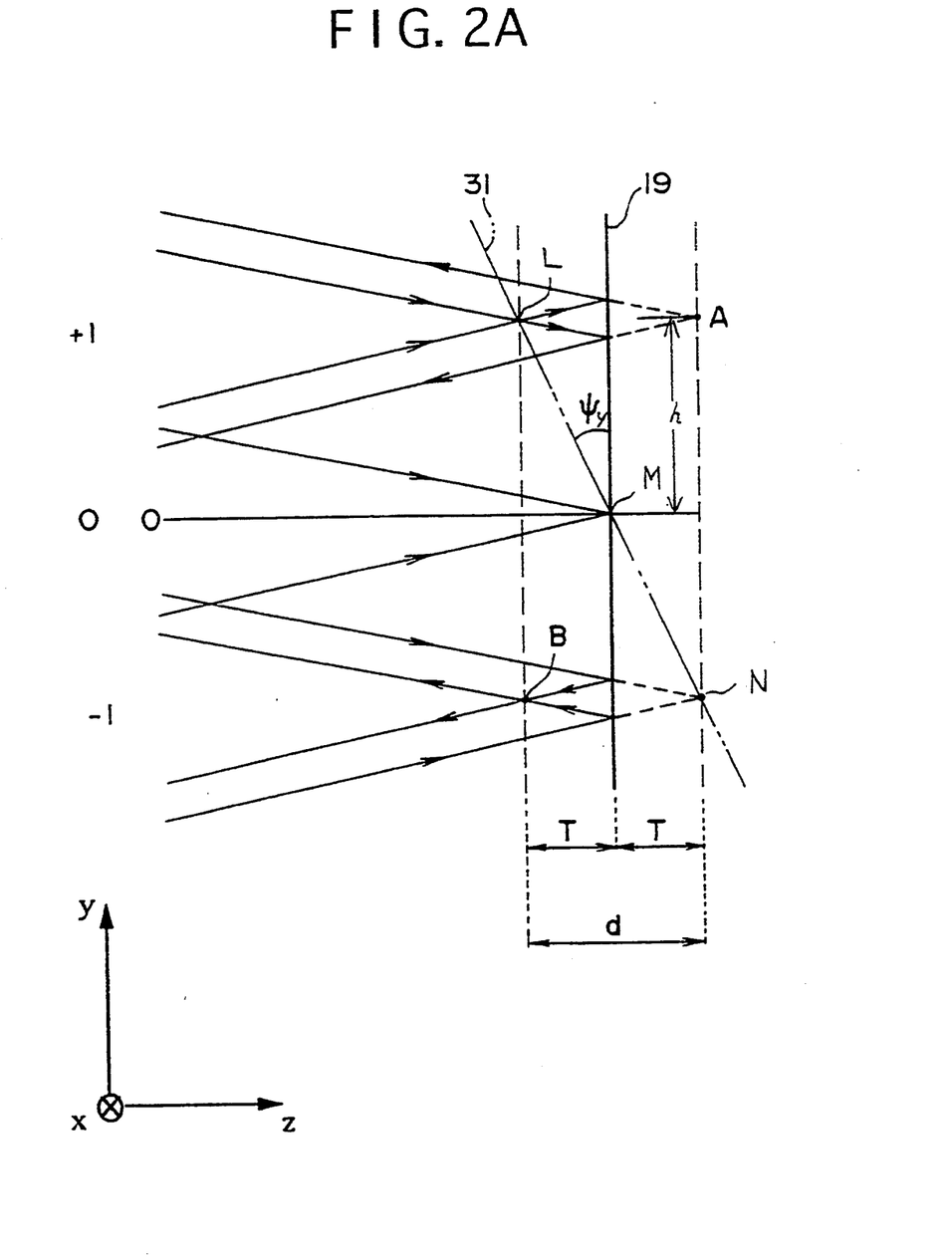
FIG. 2A shows optical paths of the 0, −1, +1 order diffracted light caused by a diffraction grating, and viewed from x-axis direction.

FIG. 2A shows the optical paths of the +1st, 0 and −1st order diffracted components which converge at points L, M and N on the y-z section line 31 of the image plane, respectively. The y-z section line 31 of the image plane is inclined counter-clockwise, in a y-z plane including the optical axis O of the measuring system, with respect to the reference plane 19 (i.e., the x-y plane).

Figure 2B:
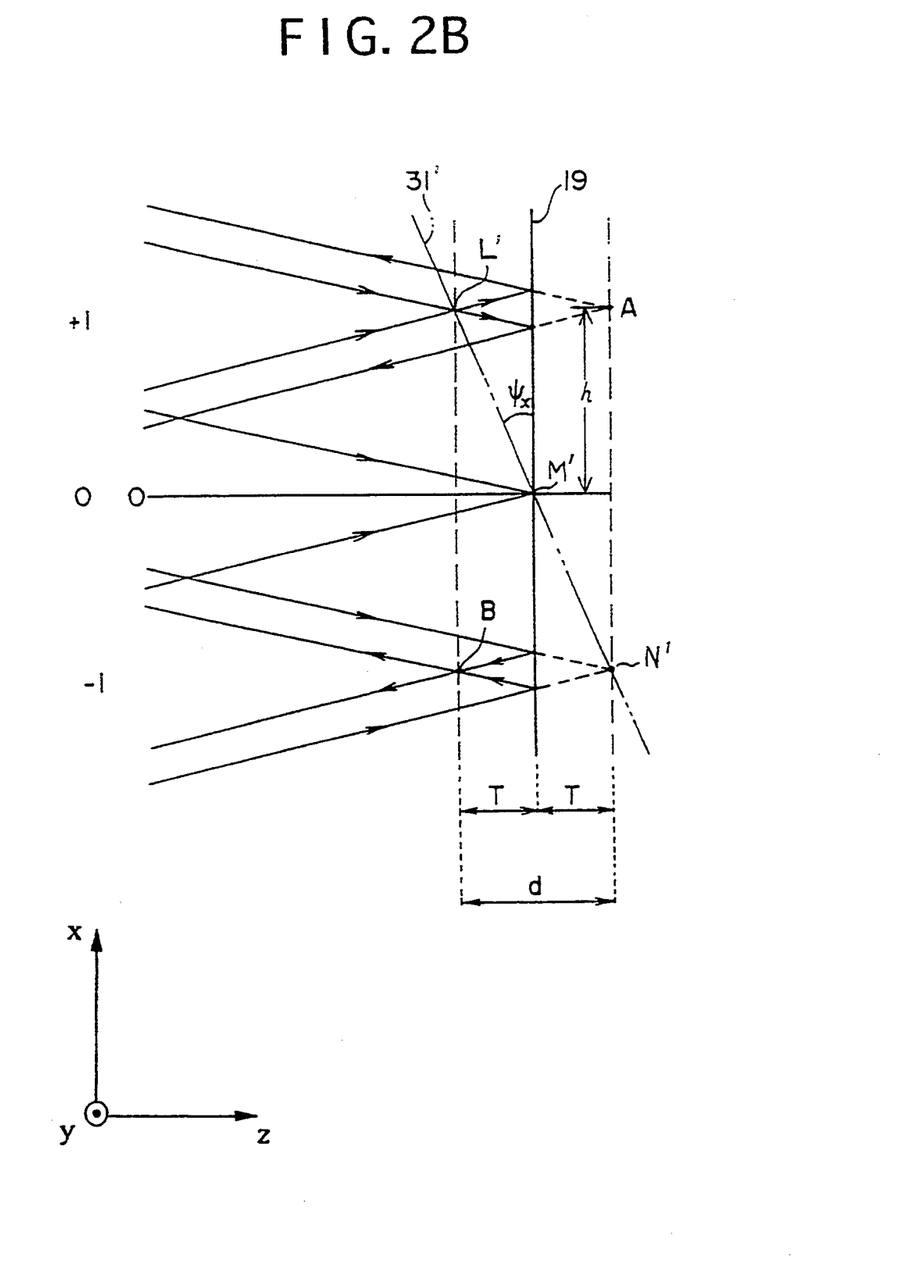
FIG. 2B shows optical paths of the 0, −1, +1 order diffracted light caused by a diffraction grating which is rotated by 90 degrees, and viewed from y-axis direction.

FIG. 2B shows the optical paths of the +1st, 0 and −1st order diffracted components which converge at points L′, M′ and N′ on the x-z section line 31′ of the image plane, respectively. The x-z section line 31′ of the image plane is inclined counter-clockwise, in a x-z plane including the optical axis O of the measuring system, with respect to the reference plane 19 (i.e., the x-y plane). Note that point M′ coincides with point M.

The image plane can be defined as a plane including the y-z section line 31 and the x-z section line 31′. If a line which coincides with the y-z section line 31 is rotated on the image plane about point M, it will coincide with the x-z section line 31′. While the line is rotated, there is a position at which the angle formed by the line and the reference plane 19 becomes the greatest. This angle also is an angle $\phi$ formed by the image plane and the reference plane 19. Hereinafter, the angle $\phi$ is referred to as an inclination angle of the image plane. Thus, as shown in FIGS. 2A and 2B, an angle formed by the y-z section line 31 and the reference plane is an x-component $\phi_x$ of the inclination angle $\phi$, and an angle formed by the x-z section line 31′ and the reference plane 19 is a y-component $\phi_y$ of the inclination angle $\phi$. Further, an imaginary plane which includes the above described line, and is perpendicular to the x-y plane, intersects the reference plane 19 along an intersecting line. Hereinafter, an angle formed by the intersecting line and x-axis will be referred to as an angle $\delta$.

Further, in the embodiments, the diffraction grating 15 is rotated. Hereinafter, an angle of a line perpendicular to the slits of the diffraction grating 15 measured from the y-axis is referred to as a rotation angle $\theta$ by which said diffraction grating 15 is rotated.

In FIGS. 2A or 2B, the +1st order diffracted light is reflected such that it appears to diverge from point A. Therefore, the optical path length of the +1st order diffracted light is elongated by 2T, where T is the distance between the point A and the reference surface 19.

The +1st order diffracted light is reflected such that it appears to diverge from point B. Therefore, the optical path length of the +1st order diffracted light is shortened by 2T, where T is the distance between the point B and the reference surface 19.

Figure 3:
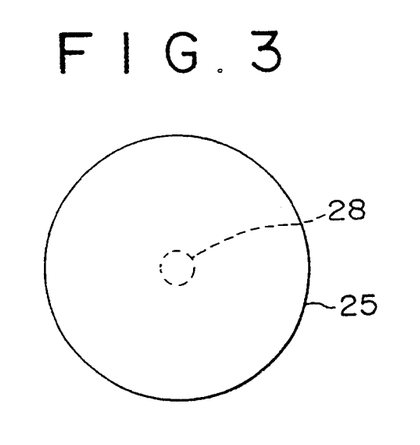
FIG. 3 shows an interference pattern formed if an image plane of a lens coincides with a reference plane.

As described above, the difference between the optical path lengths of the ±/±1st order diffracted lights is 4T. As a result of this difference, the ±/−1st order diffracted lights form an interference pattern similar to Newton's rings on the observation surface 25. As shown in FIG. 3, the photodetector 27 detects the intensity of light at the central area 28 of the observation surface 25.

As the diffraction grating 15 rotates by the angle of $\theta$, the optical part difference $P(\theta)$ and the intensity $I(\theta)$, of the interference pattern image detected by the photodetector 27, are expressed as follows:

$$P(\theta) = 4T \cos \theta \quad (1)$$

Since $I(\theta) = (\frac{1}{2}) I0 [\{1 + \cos \{(2\pi/\lambda) P(\theta)\}\}]$.

$$I(\theta) = (\frac{1}{2}) I0 [1 + \cos \{(8\pi T/\lambda) \cos \theta\}] \quad (2)$$

where, $\lambda$ is a wavelength of the laser beam, I0 is an average intensity of light. Thus, the photodetector 27 alternately detects 4 T/$\lambda$ times bright and dark bands for every 90-degree rotation of the diffraction grating 15.

Figure 4A:
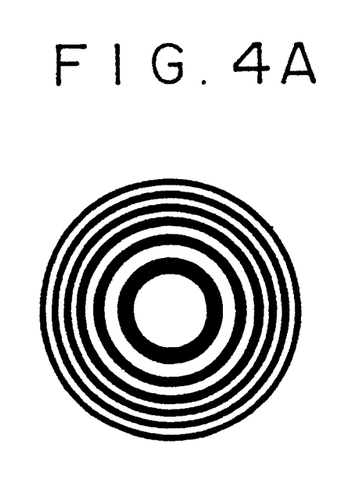
FIG. 4A shows an interference pattern formed by the diffracted components of light having different optical path lengths.
Figure 4B:
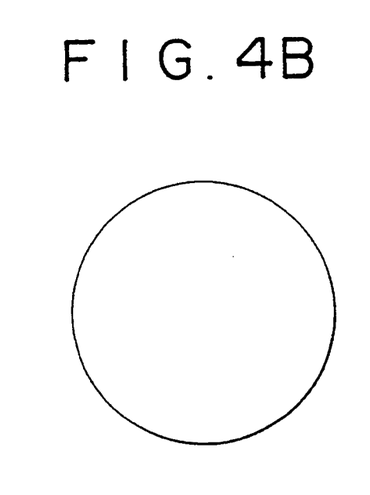
FIG. 4B shows the interference pattern formed by the diffracted components of light having the same optical path lengths.

If the image plane coincides with the reference surface 19, or the optical paths difference of −1st order and +1st order diffracted lights is 0 (zero), the interference pattern image formed on the observation plane 25 is as shown in FIG. 4B. If the image plane 31 is inclined as shown in FIGS. 2A and 2B, the interference pattern image is formed as shown in FIG. 4A.

If the image plane is inclined only in the direction shown in FIG. 2A (i.e., angle $\phi_x=0$), and the diffraction grating 15 is rotated by 90 degrees ($\theta=90$ degrees) in the direction indicated by the arrow in FIG. 1, then the optical path difference of the +1st order diffracted light and the −1st order diffracted light becomes 0

(zero), i.e., the x-z section line 31' coincides with the reference plane 19. In this condition, the interference pattern formed on the observation plane 25 is as shown in FIG. 4B.

Therefore, as described above, if the interference pattern remains as shown in FIG. 4B regardless of the rotation angle $\theta$, it can be concluded that the image plane formed by the lens 17 lies exactly on the reference plane.

Figure 5:
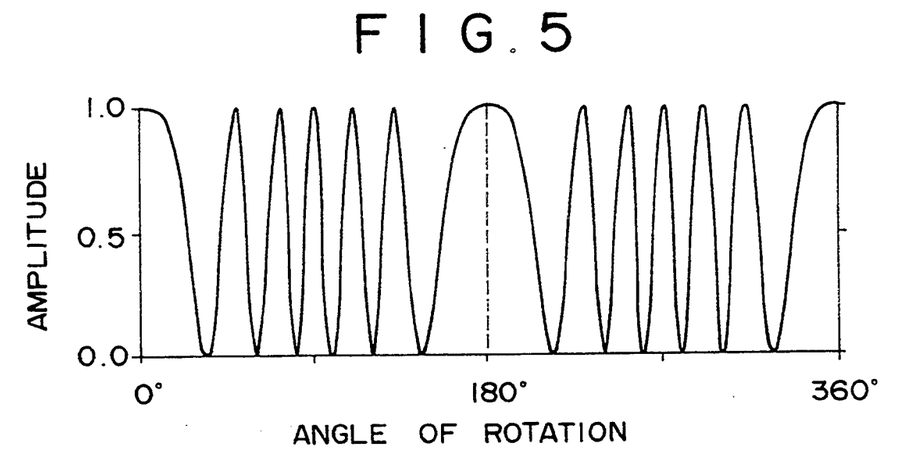
FIGS. 5 through 7 are graphs illustrating the relationship between intensity of light forming an interference pattern, and the rotation angle of the diffraction grating.
Figure 6:
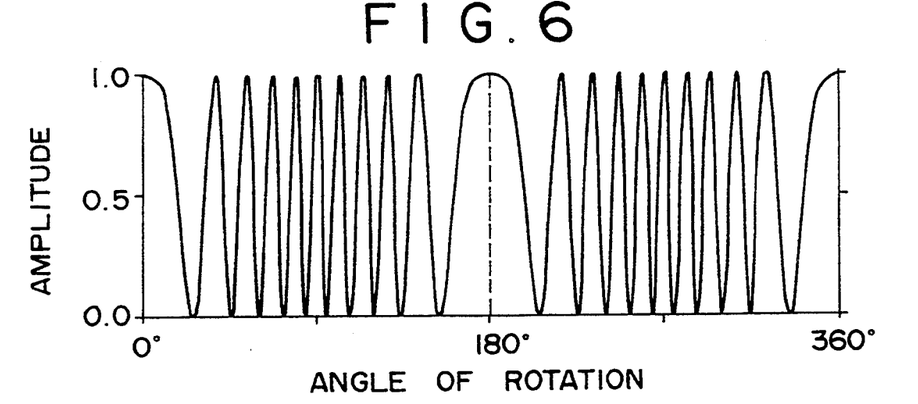
Figure 7:
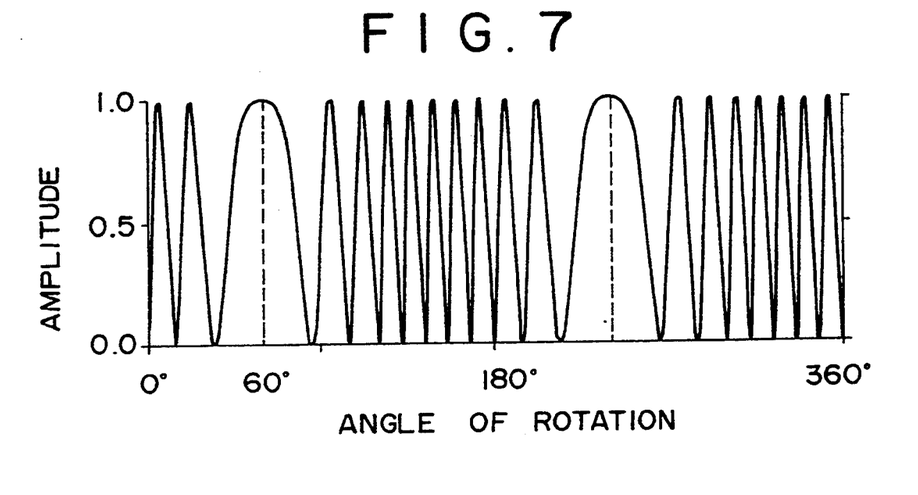

FIGS. 5 through 7 are graphs illustrating the relationship between the intensity of light detected by the sensor 27 and the rotation angle of the diffraction grating 15. If the number of peaks, n, detected while the diffraction grating 15 rotates from 0 to 180 degrees is known, the distance T can be calculated with the following equation.

$$T = n\lambda/8 \quad (3)$$

The angle of inclination $\phi$ can be calculated by using the following equations:

$$\phi = \tan^{-1}(d/2h)$$
$$= \tan^{-1}(T/h)$$

where h is the height of the diverging point A, above the optical axis, and is given by the equation:

$$h = \lambda F/\text{pitch}$$

where F is the focal length of the lens 17, $\lambda$ is the wavelength of the light, and pitch is the spacing between the slits of the diffraction grating 15.

Since $\phi$ is small, $$\phi = (n \times \text{pitch})/8F \quad (4)$$

On the graphs shown in FIG. 5 through 7, the angle $\delta$ corresponds to the rotated angle $\theta$ of the diffraction grating 15, at which the wavelength is the longest. Thus the angle $\delta$ corresponds to the rotated angle $\theta$ at which the peak of a wave between two adjacent troughs has the longest wavelength (distance between adjacent troughs). In these graphs, the peaks of the waveform correspond to the situation that the optical path difference of the +1st and −1st order diffracted lights is $2n\lambda/2$, and the troughs of the waveform correspond to the situation that the optical difference of the +1st and −1st order diffracted lights is $(2−1)n\lambda/2$. The center of the wave between two adjacent troughs or peaks having the longest wavelength corresponds to the angle $\delta$. From the number of the peaks detected between angles of rotation of the diffraction grating 15 (ie., between 0 and 180 degrees as shown in FIGS. 5 and 6), the angle of inclination $\phi$ can be obtained with use of equation (4) above.

In FIG. 5, there are 6 peaks detected within the angular range 0-180 degrees. Thus, the angle of inclination $\phi$ is given as:

$$\phi = 0.75 \times (\text{pitch}/F).$$

In FIGS. 6 and 7, there are 10 peaks in the range 0-180 degrees, and therefore the angle of inclination $\phi$ is given as:

$$\phi = 1.25 \times (\text{pitch}/F).$$

In FIGS. 5 and 6, the wave having the longest wavelenth appears when the rotated angle $\theta$ of the diffraction grating 15 is 0, 180 and 360 degrees. Since the rotated angle $\theta$ of the diffraction grating 15 corresponds to the angle $\delta$, the angle $\delta$ is 0, 180, or 360 degrees. In FIG. 7, the wave having the longest wavelength appears when the diffraction grating 15 is rotated by 60 degrees. Thus, the angle $\delta$ is 60 degrees.

Note that, in FIGS. 5 through 7, when the driving (rotation) angle $\theta$ of the diffraction grating 15 is 0 or 180 degrees, the slits of the diffraction grating 15 extend in the direction of x-axis. When $\theta = 90$ or 270 degrees, the slits of the diffraction grating 15 extend in the direction of y-axis.

In the first embodiment, a parallel laser beam passes through the diffraction grating 15 and the lens 17 via the reference reflection plane 19. Change in the interference pattern formed by the two diffracted components is observed while the diffraction grating 15 is being rotated. From the number of dark and bright patterns occurring as the diffraction grating 15 is being rotated, the inclination amount or the inclination angle is obtained. From the wavelength of the longest dark and bright pattern, the angle $\delta$ is obtained.

Figure 8:
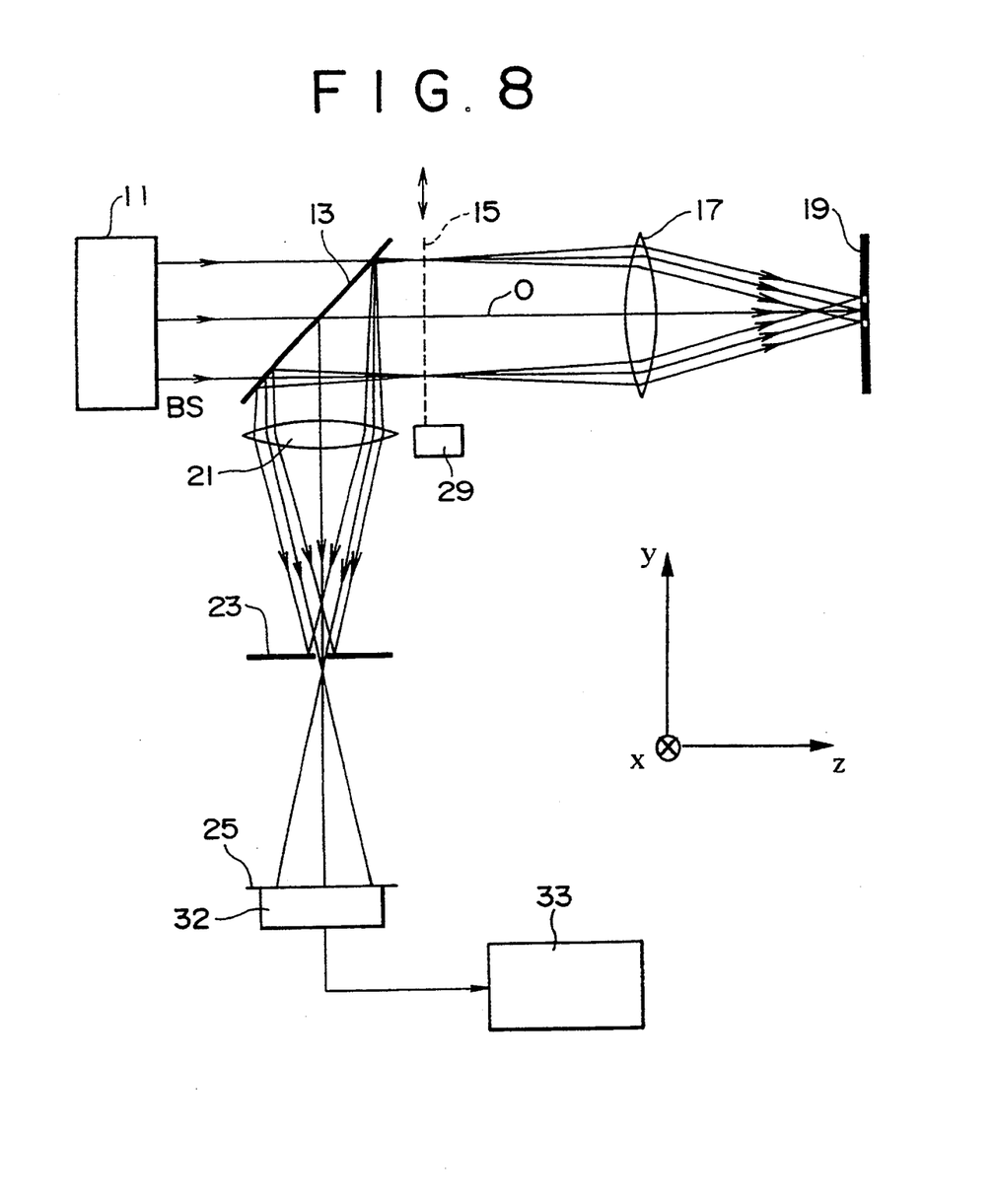
FIG. 8 shows the construction of a second embodiment of the system used to measure a tilt of an image plane of a lens system with respect to a reference plane.

FIG. 8 shows a second embodiment of the present invention. The embodiment is similar to the first embodiment shown in FIG. 1, except that the diffraction grating 15 is also moved horizontally and vertically, in addition to being rotated. Further, the photodetector 27 is replaced with a CCD 32 in order to detect an image data of the interference pattern. Other elements which are common to both embodiments have the same reference numbers.

Figure 9:
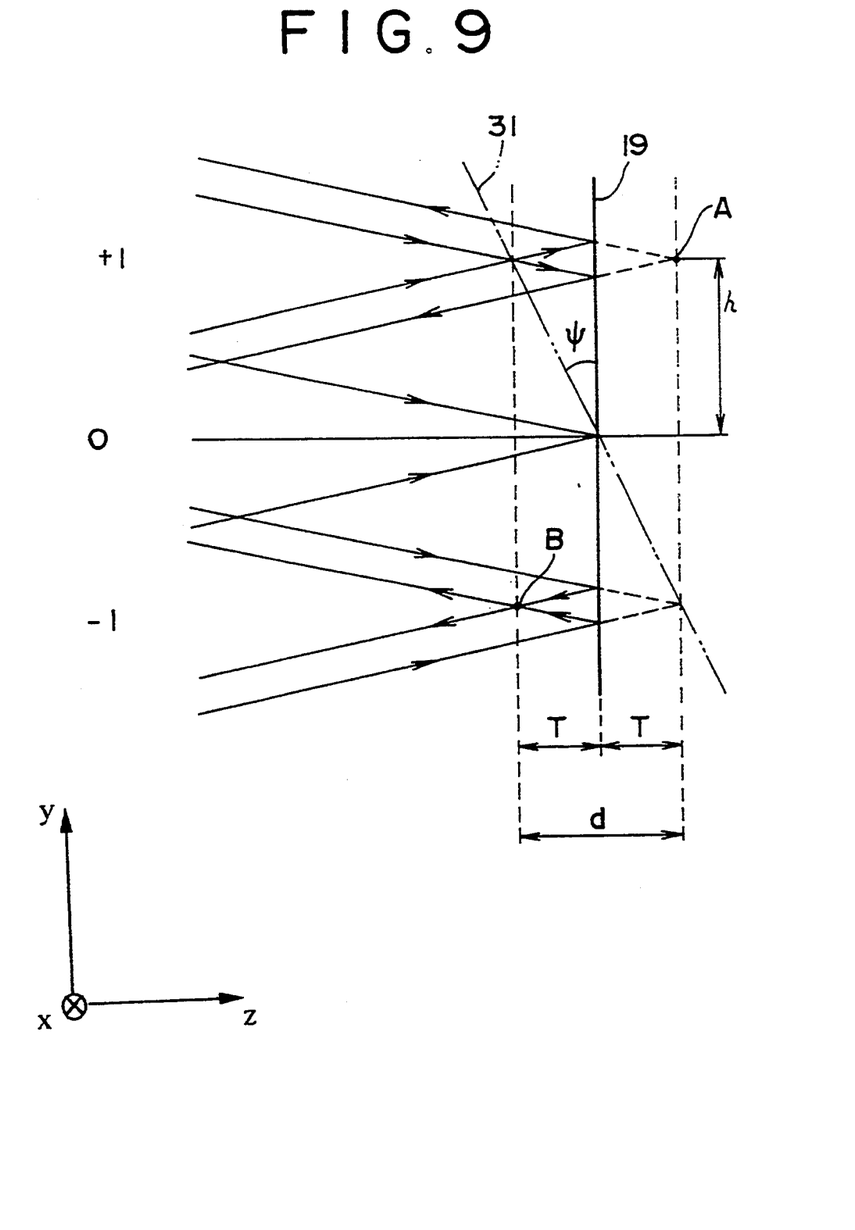
FIG. 9 shows optical paths of the 0, −1, +1 order diffracted light, resulting from the use of the measuring system shown in FIG. 8.

FIG. 9 shows the optical path of the diffracted light. This is similar to FIG. 2. The distance d between the points A and B along the optical axis (see FIG. 9) is obtained as follows:

$$d = PD/2[1 - \{4f^2/(4f^2+1)\}^{\frac{1}{2}}]$$

where, f is an effective aperture of the lens 17; and PD is a defocus component of phase difference between the two diffracted components.

When the 1st and −1st order diffracted light interfere, an interference pattern as shown in FIG. 4A is formed. In FIG. 4A, the interference pattern is shown on an exaggerated scale, over many wavelengths. However, the defocus component PD of the actual interference pattern is less than $1\lambda$, and it is impossible to obtain the defocus component PD directly from the interference pattern. Therefore, the image data detected by the CCD 32 is transmitted to a computer 33 (see FIG. 9), and analyzed using a well-known measurement technique such as PMI (phase measurement interferometry) method to obtain the defocus component PD.

Once the distance d is obtained, the angle of inclination $\phi$ is obtained using the following equations:

$$\phi = \tan^{-1} d/2h \quad (5)$$
$$= d/2h \text{ (because } \phi \text{ is very small)}$$

where h is $\lambda F/\text{pitch}$ as defined in the first embodiment. Therefore, $$\phi = PD^*\text{pitch}/4\lambda F[1 - \{4f^2/(4f^2+1)\}^{\frac{1}{2}}] \quad (6)$$

Figure 10A:
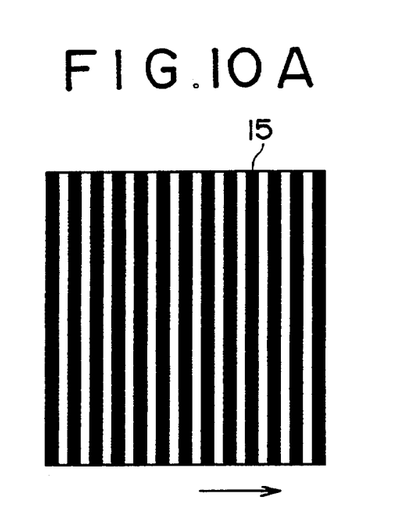
FIGS. 10A and 10B show a diffraction grating used with the measuring system, oriented vertically and horizontally, respectively.
Figure 10B:
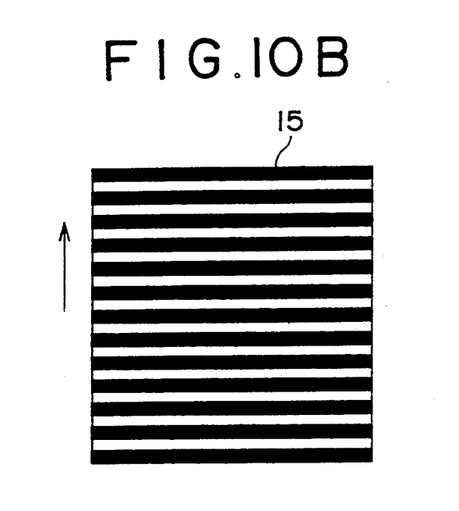

FIGS. 10A and 10B show a diffraction grating 15 and the movement thereof. The mechanism 29 rotates the diffraction grating about the optical axis of the measuring system, and further in the direction of either x-axis or y-axis.

The diffraction grating 15 is first positioned such that the angle $\theta = 0$ as shown in FIG. 10A. Then, the diffraction grating 15 is moved in the direction of y-axis to obtain the image data. From the obtained image data, the distance $d_y$ is obtained. Note that the distance $d_y$ is an y-axis component of the actual distance d.

The diffraction grating 15 is then rotated by 90 degrees so that the angle $\theta = 90$ degrees as shown in FIG. 10B. Then, the diffraction grating 15 is moved in the direction of x-axis to obtain image data. From the obtained image data, an x-axis component distance $d_x$ is determined.

From these two component distances, the distance d and the angle $\delta$ can be calculated using the following equations:

$$d = (d_x^2 + d_y^2)^{\frac{1}{2}}$$

$$\delta = \tan^{-1}(d_x/d_y).$$

Further, the angle of inclination $\phi$ can be determined from equation (6) above.

The movement amount Mv, of the diffraction grating 15 required to shift the interference pattern by one fringe is obtained from the following equation:

$$Mv = \text{pitch}/mP \qquad (7)$$

where, m is a difference between the orders of the diffracted light which interfere with each other, and P is a coefficient determined from the number of times the light passes through the diffraction grating 15.

For example, if the ±1st order diffracted light is used, m equals 2, and if the diffracted light passes through the diffraction grating twice, P equals 2. In this embodiment, m=2 and P=2.

In the second and third embodiments, the diffraction grating 15 is moved by the amount Mv, and the interference pattern on the observation plane 25 is measured. To the image data obtained by the CCD 32, a predetermined process (such as a least squares method) is applied to obtain an interference pattern data. From the interference pattern data, the defocus component PD is obtained. From the defocus component PD, the distance d and the angle $\delta$ are obtained using the above equations.

In the first embodiment, the tilt of the image plane is determined based on the data obtained by rotating the diffraction grating 15. In the second embodiment, the direction of the movement of the grating 15 and the amount of movement are important to determine the tilt of the image plane. For example, when the slit spacing is 25 $\mu$m, interference of the ±1st order diffracted light observed, and a 4-step method is used as the phase shift algorithm, the diffraction grating 15 must be moved with an accuracy of 1.5625 $\mu$m.

A third embodiment of the present invention is similar to the second embodiment described before, except that the diffraction grating 15 is positioned such that the slits are inclined at angle $\phi$ and then the diffraction grating 15 is moved in the horizontal direction. Thus, the movement amount of the diffraction grating 15 is reduced to cos $\phi$ (<1) of the movement amount in the horizontal direction. In other words, the driving resolution of the moving mechanism becomes greater than its mechanical resolution, thus relatively accurate measurement is enabled.

Further, since the diffraction grating 15 is moved horizontally (i.e., in the same direction) to measure both the $d_x$ and $d_y$ components, the mechanical construction of the moving mechanism is simplified.

Figure 11A:
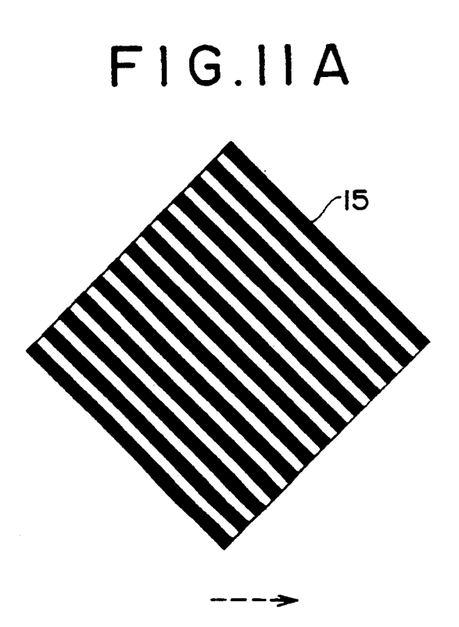
FIGS. 11A and 11B show the diffraction grating of FIGS. 10A rotated at angle of 45 and −45 degrees.
Figure 11B:
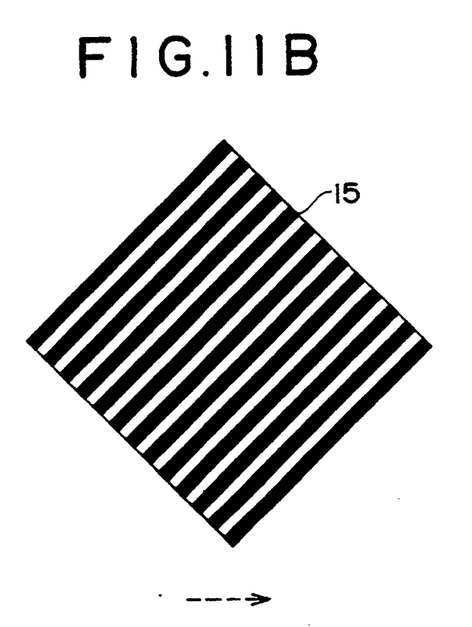

The operation will be described. The diffraction grating is first positioned so that the angle $\theta = 45$ degrees as shown in FIG. 11A. Then the diffraction grating 15 is moved in direction of y-axis to obtain one component of the distance $d_{45}$. Similar to the above, another component $d_{-45}$ is obtained by positioning the diffraction grating 15 at angle $\theta = -45$ degrees as shown in FIG. 11B, and moving it in the same direction (i.e., the direction of y-axis) as in the previous measurement of $d_{45}$.

From the obtained component distances $d_{45}$ and $d_{-45}$, the distance d and the angle $\delta$ are calculated with use of the following equations:

$$d = (d_{45}^2 + d_{-45}^2)^{\frac{1}{2}}$$

$$\delta = \tan^{-1}(d_{45}/d_{-45}) - 45°$$

Figure 12:
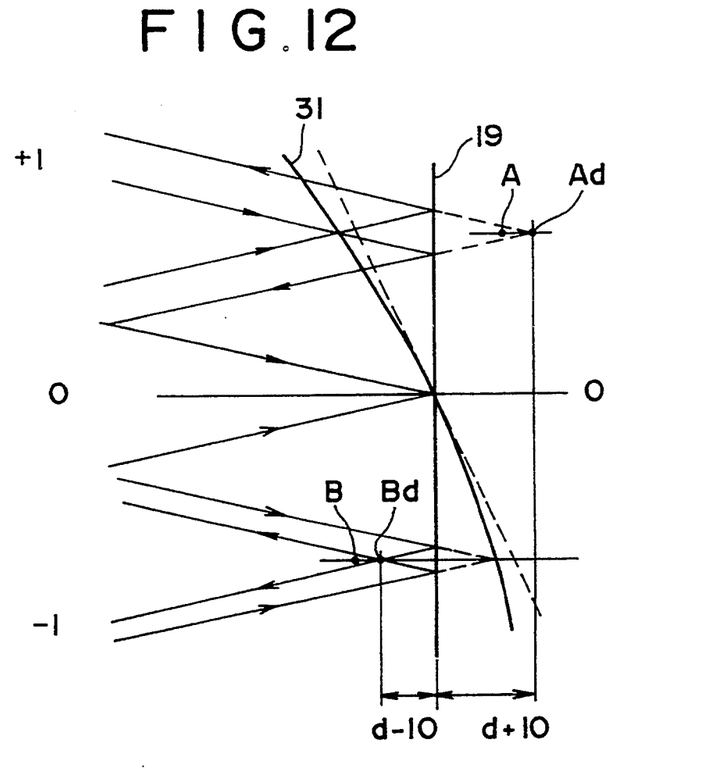
FIG. 12 shows optical paths of the 0, −1, +1 order diffracted light for a lens having a curved image plane.

If the image plane 31 is curved, the points A and B would be different from those shown in FIG. 9. 12 shows points Ad and Bd. The average tilt and the curvature of the image plane are obtained with the following equations:

The average tilt $= d_{(+10)} - d_{(-10)}$

The curvature of the image plane $= (+10) + d_{(-10)}$ where, $d_{(+10)}$ and $d_{(-10)}$ are distances from the reference plane 19 to the points Ad and Bd. Distance $d_{(+10)}$ is obtained with use of the 0 and +1st order diffracted light, $d_{(-10)}$ is obtained from the interference pattern of 0 and −1st order diffracted light. When +1 and 0 order diffracted light is used for measurement, another reference surface 19 is used having the shape of the reflection surface being formed to reflect only the +1 and 0 order diffracted components. As to the spatial filter 23, the same filter 23 as is used in the previous embodiments is used, (i.e., the spatial filter allows light to pass only along the optical axis of the measuring system).

With the above construction, if an N-th order diffracted light is reflected on the reference surface, and passes through the diffraction grating 15 again, only the −N-th order diffracted component of the N-th order diffracted light passes through the spatial filter 23. Thus, −1st order diffracted component of the 1st order diffracted light. 2nd order diffracted component of the −2nd order diffracted light etc., pass through the spatial filter 23.

Figure 13:
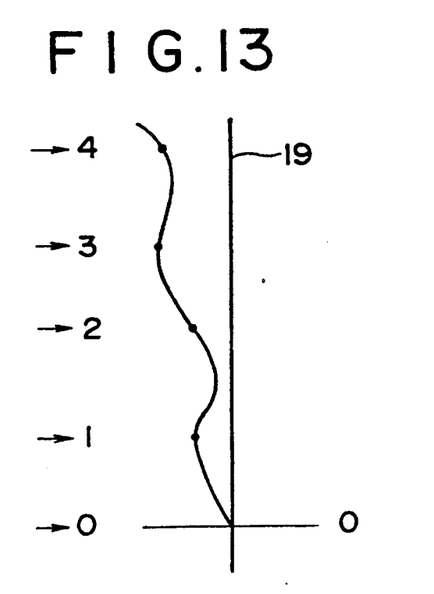
FIG. 13 shows an image plane taking into consideration the 0, 1st, 2nd 3rd and 4th order diffracted light.

If the image plane is more complex, the diffracted light of the 2nd order or higher are used. For example, with 0 and 1st order diffracted light, the distance difference $d_{(30\ 10)}(\theta)$ is obtained by changing $\theta$, where $\theta$ is an angle of rotation of the diffraction grating 15. Similar measurement operations using higher order diffracted light can be executed, and the distance $d_{(20)}(\theta)$, $d_{(30)}(\theta)$, $d_{(40)}(\theta)$, ..., $d_{(n0)}(\theta)$ can be obtained. A curve connecting the distance differences shows the two-dimensional distribution of the image plane. FIG. 13 shows a distribution of distances obtained, along one direction.

Figure 14:
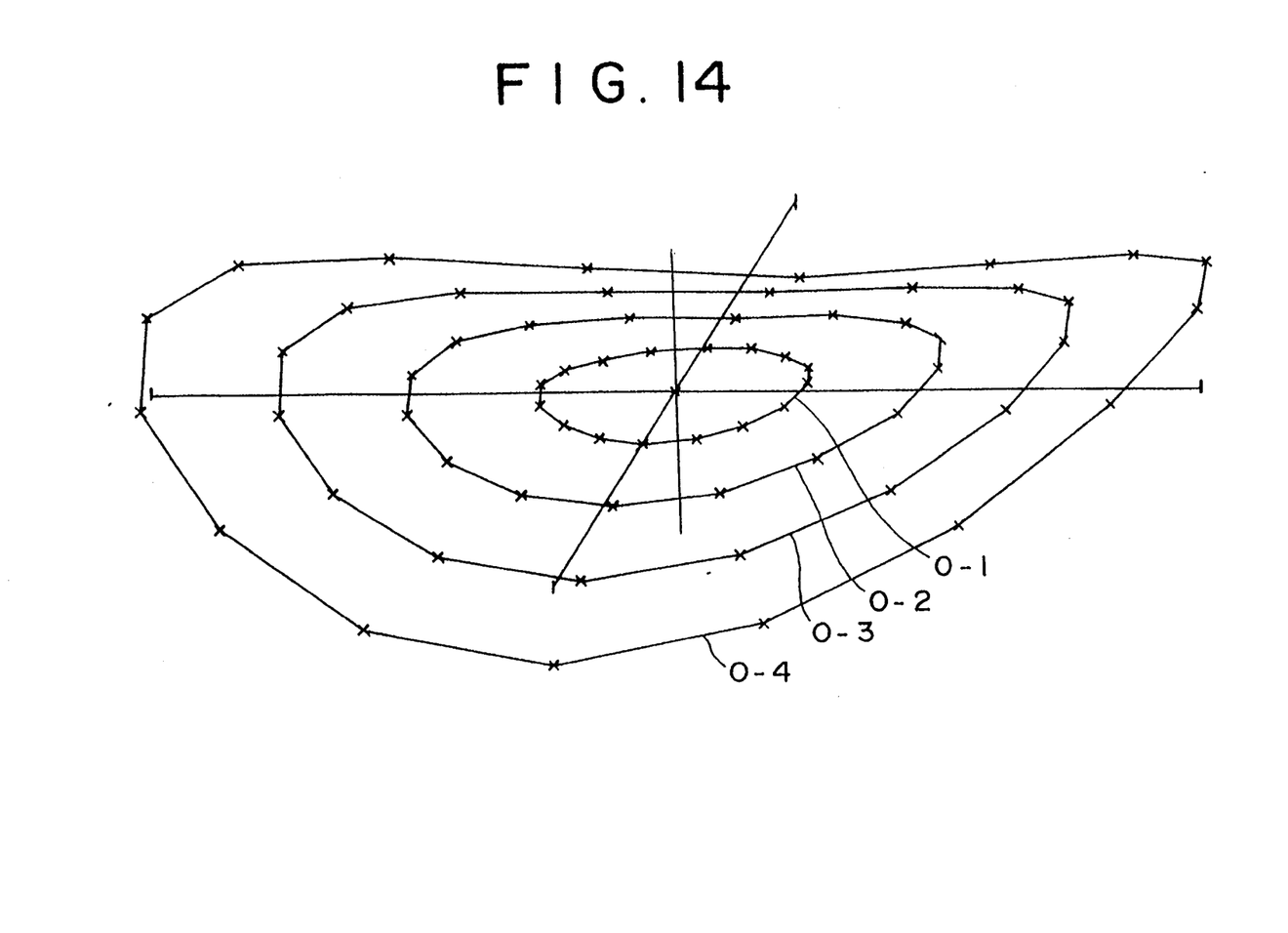
FIG. 14 shows a three-dimensional view of the image plane shown in FIG. 13.

FIG. 14 is a graph showing the three-dimensional distribution of the distances obtained as described above. With respect to a point where the 0 order diffracted light is reflected, the distances are measured as the angle of rotation of the diffraction grating 15 is varied, and plotted to obtain the three-dimensional distribution.

Figure 15:
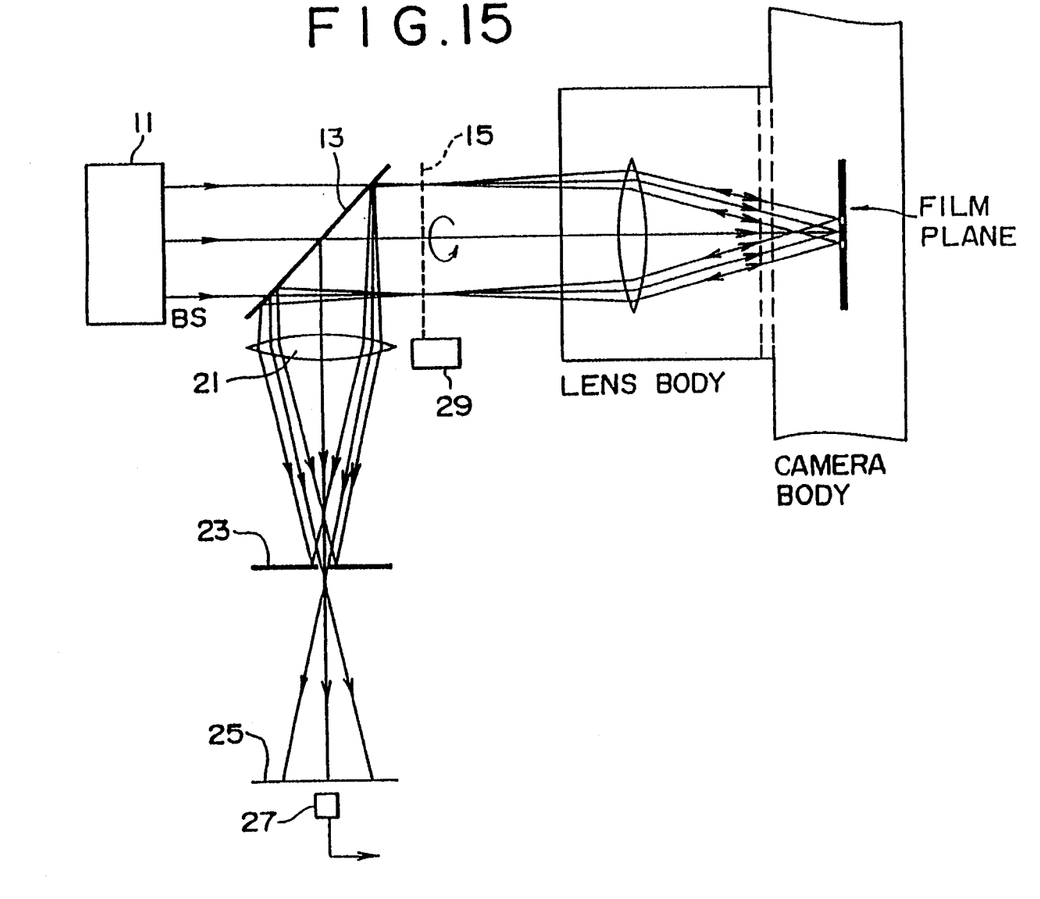
FIG. 15 shows the measuring system used to check the alignment of a film plane of a camera.

The description above is related to the measurement of an inclination and rotation of a lens. However, if a lens that is known to produce an accurate image plane is used in the measuring system, the accuracy of the positioning of a reference plane can be checked. More specifically, if a camera having a lens attached is placed in the measuring system, as shown in FIG. 15, the accuracy of the positioning of the film plane of the camera can be checked. Further, for a camera employing a detachable lens system, the accuracy of the mounting of the lens can also be checked.

Therefore, a simple measuring system as described above, can be used to determine whether a lens has been assembled correctly, or whether one of the lenses that is used in a multiple lens system has been manufactured correctly or positioned correctly.

In the second and third embodiments, the diffraction grating 15 is rotated to two different positions and moved horizontally. The angles of the rotation of the diffraction grating 15 is 0 and 90 degrees in the second embodiment, and 45 and −45 degrees in the third embodiment. Any two angles can be used as long as they are different. Assuming that the angles of rotation of the diffraction grating are $\alpha$ and $\beta$, and measured components of the distance d are $d_a$ and $d_b$, respectively, the distance d and the angle $\delta$ are obtained with following equations:

$$d = (d_a^2 + d_b^2)^{\frac{1}{2}}$$

$$\delta = \tan^{-1}(s/c)$$

where,
$c = d_a \cos \alpha + d_b \cos \beta$
$s = d_a \sin \alpha + d_b \sin \beta$.

A laser light source 11 is used as the main light source, however any light source (preferably the one emits coherent parallel light) may be employed.

The present disclosure relates to subject matter contained in Japanese Patent Application No. HEI 5-073558 filed on Mar. 31, 1993 and HEI 5-084404 filed on Apr. 12, 1993.

What is claimed is:

1. A system for measuring a tilt of an image plane of light focused by a lens relative to a predetermined plane, the system comprising:
   a light source for emitting light towards said lens;
   a diffraction grating located between said light source and said lens; said lens converging diffracted light passed through said diffraction grating;
   a reflection surface formed on said predetermined plane to reflect, a pair of predetermined components of said diffracted light converged by said lens and incident onto said reflection surface, back towards said lens, said predetermined plane located in a vicinity of a focal point of said lens and of the image plane;
   means for detecting an interference pattern image formed by said diffracted light which is reflected by said reflection surface, passed through said lens, and passed through said diffraction grating;
   means for driving said diffraction grating within a plane perpendicular to an optical axis; and
   means for determining an inclination of the image plane based upon a change of the interference pattern in response to driving of said diffraction grating by said driving means.

2. The system according to claim 1, said light source emitting coherent parallel light towards said lens.

3. The system according to claim 1, said detecting means comprising:
   a converging lens;
   a screen, said converging lens allowing light, incident to said detecting means, to pass through, and forming said interference pattern on said screen; and
   a photodetector for detecting intensity of light which forms said interference image at a predetermined portion of said screen.

4. The system according to claim 3, driving means further comprising means for rotating said diffraction grating in a direction perpendicular to an optical axis of said system, said photodetector alternately detecting dark and bright patterns as said diffraction grating rotates.

5. The system according to claim 4, said predetermined plane being perpendicular to the optical axis of said system, and an angle of inclination of said image plane with respect to said predetermined plane being obtained from a detected number of said dark and bright patterns while said diffraction grating rotates by 180 degrees.

6. The system according to claim 5, a rotated angle of said image plane with respect to a predetermined direction corresponding to an angular portion, with respect to said predetermined direction, where a change of an intensity of said interference pattern image is most dense as said diffraction grating is rotated.

7. The system according to claim 6, said detecting means further comprising a spatial filter, said predetermined components include +1st order and −1st order diffracted components of said light, said spatial filter passing only −1st order diffracted component of said +1st order diffracted component which is reflected by said reflection surface, and +1st order diffracted component of said −1st order diffracted component which is also reflected by said reflection surface.

8. The system according to claim 7, a difference of optical path lengths of said diffracted components detected by said photosensor being obtained with the equation:

$$T = n\lambda/8$$

where, T is a quarter of a difference in said optical path lengths, n is the number of dark and bright pattern detected by said photosensor while said diffraction grating is rotated by 180 degrees, and $\lambda$ is a wavelength of said coherent light.

9. The system according to claim 1, said detecting means comprising:
   a converging lens;
   a screen, said converging lens allowing light incident to said detecting means to pass through, and forming said interference pattern on said screen; and
   an image sensor for detecting said interference pattern.

10. The system according to claim 9, said diffraction grating being provided with a plurality of slits all extending in one direction, said driving means supporting said diffraction grating at first and second positions, at which the extending direction of said slits are different, said driving means moving said diffraction grating at least in a direction perpendicular to the extending direction of said slits.

11. The system according to claim 10, the extending direction of said slits, and when said grating is located at said first position and that when said grating is located at said second position being 90 degrees apart.

12. The system according to claim 11, said detecting means detecting difference of optical path lengths of said diffracted components from changes of said interference pattern which changes as said diffraction grating is moved.

13. The system according to claim 12, said detecting means detecting said difference of said optical path lengths with respect to direction in which said diffraction grating is moved in each movement of said diffraction grating.

14. The system according to claim 13, said detecting means detecting said difference of said optical path lengths by use of the following equation:

$$d = PD/2[1 - \{4f^2/(4f^2+1)\}^{\frac{1}{2}}$$

where, d is a half of said difference of said optical path lengths, f is an effective aperture of the lens system, and PD is a defocus component of a difference of a phase of said diffracted components.

15. The system according to claim 14, an angle of inclination of said image plane with respect to said predetermined plane being determined using an equation:

$$\phi = PD*\text{pitch}/4 \lambda F[1 - \{4f^2/(4f^2+1)\}^{\frac{1}{2}}]$$

where, $\phi$ is the angle of inclination, $\lambda$ is a wavelength of said coherent light, F is a focal length of said lens, and PD is said defocus component of said phase difference of said diffracted components.

16. The system according to claim 1, said reflection surface reflecting said pair of predetermined components of said diffracted light, at points symmetrical about the optical axis.

17. The system according to claim 1, said detecting means detects changes in intensity of said interference pattern image occuring at spaced locations on an observation plane and said determining means determines phase differences between the intensity at said spaced locations.

18. The system according to claim 1, said detecting means detects an intensity of said interference pattern image at a predetermined location on an observation plane and said determining means determines changes in frequency of said interference pattern image.

19. An image tilt measuring system for measuring tilt of a plane of an image formed by an optical system, said optical system comprising:
a light source for emitting coherent light onto the optical system;
a diffraction grating provided between said light source and said optical system;
a rotation mechanism for rotating said diffraction grating about an axis which is parallel to an optical axis of said optical system;
a reference reflection plane located in a vicinity of a focal point of said optical system for reflecting diffracted light which is diffracted by said diffraction grating and passed through said optical system;

detecting means for detecting an interference pattern, which is formed by different order components of said diffracted light which are passed through diffraction grating and said optical system, said interference pattern changing with a rotation of said diffraction grating; and
means for determining an inclination of said optical system based upon a change in said interference pattern in response to rotation of said diffraction grating by said rotation mechanism.

20. The system according to claim 19, said reference reflection plane reflecting only 1st and -1st components of incident light.

21. The system according to claim 19, said detecting means detects changes in intensity of said interference pattern occurring at spaced locations on an observation plane and said determining means determines phase differences between the intensity at said spaced locations.

22. The system according to claim 19 said detecting means detects an intensity of said interference pattern at a predetermined location on an observation plane and said determining means determines changes in frequency of said interference pattern.

23. An image tilt measuring system, for measuring tilt of a plane of an image formed by an optical system, said optical system comprising:
a light source for emitting coherent light to the optical system;
a diffraction grating provided between said light source and said optical system;
a reference reflection plane located in a vicinity of a focal point of said optical system for reflecting diffracted light which is diffracted by said diffraction grating and passed through said optical system;
means for receiving an interference pattern image, which is formed by different order of components of said diffracted light which have passed through said diffraction grating and said optical system;
means for moving said diffraction grating in order to shift a phase of said interference pattern image formed by said different order components of said diffracted light;
means for measuring an inclination of said image plane with respect to said reference reflection plane based on a phase difference of said interference pattern image resulting from movement of said diffraction grating by said moving means.

24. The system according to claim 23, said moving means moving said diffraction grating twice in a direction perpendicular to an optical axis of said system with an extending direction of slits of said diffraction grating being changed.

25. The system according to claim 23, further comprising means for converting said interference pattern image into an image data, said measuring means measuring an inclination of said image plane based on said image data.

26. The system according to claim 23, said measuring means measures changes in intensity of said interference pattern image occurring at spaced locations on an observation plane.

27. The system according to claim 23, said measuring means measures changes in frequency of said interference pattern image at a predetermined location on an observation plane.

* * * * *

UNITED STATES PATENT AND TRADEMARK OFFICE
CERTIFICATE OF CORRECTION

PATENT NO. : 5,448,355
DATED : September 5, 1995
INVENTOR(S) : M. NOGUCHI et al.

It is certified that error appears in the above-indentified patent and that said Letters Patent is hereby corrected as shown below:

A column 10, line 16 (claim 4, line 1), before "driving" insert ---said---;
At column 10, line 52 (claim 8, line 7), change "pattern" to ---patterns---.
At column 11, line 5 (claim 11, line 2), delete "and".
At column 11, line 6 (claim 11, line 3), delete "that.
At column 11, line 7 (claim 11, line 4), change "position" to ---position,---.
At column 11, line 9 (claim 12, line 2), after "detecting" insert ---a---.
At column 11, line 22 (claim 14, line 4), change "(4f²+1}¼" to ---(4f²+1)}¼"---.
At column 12, line 44 (claim 23, line 20), after "light;" insert ---and---.

Signed and Sealed this

Sixteenth Day of April, 1996

BRUCE LEHMAN

*Attest:*

*Attesting Officer*    *Commissioner of Patents and Trademarks*